May 21, 1940.  H. A. BEEKHUIS, JR  2,201,423
PROCESS FOR TREATING LIQUIDS CONTAINING NITRIC AND HYDROCHLORIC ACIDS
Filed June 21, 1938
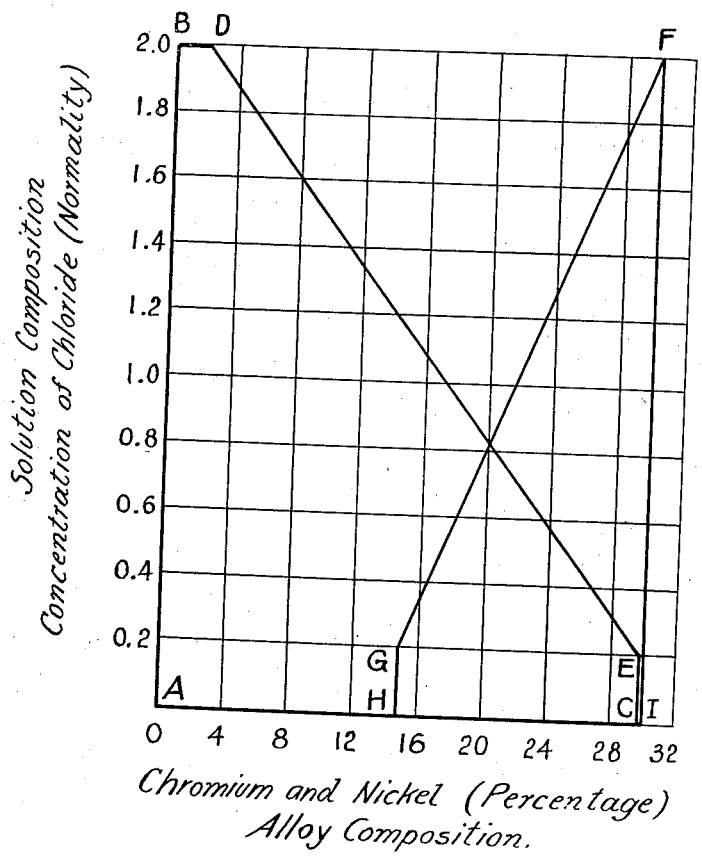
INVENTOR
Herman A. Beekhuis, Jr.
BY
Charles W. Brown
ATTORNEY Patented May 21, 1940

2,201,423

UNITED STATES PATENT OFFICE 2,201,423

PROCESS FOR TREATING LIQUIDS CONTAINING NITRIC AND HYDROCHLORIC ACIDS

Herman A. Beekhuis, Jr., Petersburg, Va., assignor to The Solvay Process Company, New York, N. Y., a corporation of New York Application June 21, 1938, Serial No. 214,908

10 Claims. (Cl. 23—1)

This invention relates to the construction and operation of an apparatus wherein metal surfaces of the apparatus are exposed to contact with a fluid containing nitric acid, hydrochloric acid and water. The invention is particularly directed to the apparatus and processes used for the production of a metal nitrate and chlorine or hydrogen chloride through the reaction of nitric acid and a metal chloride such as sodium chloride, potassium chloride or calcium chloride.

Processes involving the reaction of nitric acid and a metal chloride usually require the heating or cooling of solutions containing both nitric and hydrochloric acids by indirect heat exchange. It is highly important to construct the heat exchange surfaces of a metallic material so that there will be a high heat transfer efficiency between the heating or cooling fluid and the solutions being heated or cooled. However, solutions containing both nitric and hydrochloric acids have an unusually extreme corrosive action on most of the metals available as materials of construction in chemical plants. Again, it is required in the process for reacting nitric acid and a metal chloride to conduct away from the reaction vessel and treat in various manners gas mixtures containing nitrosyl chloride and chlorine or a gas containing hydrogen chloride, depending upon the conditions under which the nitric acid and metal chloride are reacted. These gases usually contain vapors of nitric acid and water. Such gas mixtures likewise present the problem of extremely high corrosiveness towards the usual metals used in chemical plant construction. Liquid condensates containing nitric and hydrochloric acids may form from the gases and these liquid condensates will rapidly attack most metals.

It is an object of this invention to provide a metallic material of construction for apparatus wherein the metal is exposed to contact with an aqueous liquid containing nitric and hydrochloric acids. It is a further object of the invention to provide a mode of operation of apparatus wherein metal surfaces are exposed to contact with a liquid containing nitric and hydrochloric acids and water, whereby the metallic material used in the construction of such apparatus is protected against undue corrosion.

I have discovered that chrome-iron alloys are suitable materials of construction for the apparatus with which this invention is concerned when such alloys are of a particular composition with respect to the percentages of chromium and nickel contained therein and when specific conditions of operation of the apparatus are observed. The invention comprises constructing the surfaces of an apparatus which are to be exposed to contact with a liquid containing nitric and hydrochloric acids and water of a chrome-iron alloy containing 15% to 30% chromium, 0% to below 30% nickel, with the nickel content less than the chromium content, and the remainder principally iron. In order to protect these chrome-iron alloys from corrosion, the surfaces exposed to contact with the liquid containing nitric and hydrochloric acids and water are maintained completely wetted with an aqueous solution of nitric acid and hydrochloric acid in which the concentration of nitrate (both as nitric acid and as nitrate salts which may be present in the solution) is at least equal to the concentration of chloride present in the solution (both as hydrogen chloride, chlorine and chlorides) and the chloride concentration is maintained below 2-normal. Further, the composition of the chrome-iron alloy is correlated with the composition of the solution with which it is wetted in such a manner that as the chloride concentration of the solution is increased above 0.2-normal upwardly towards 2-normal, the minimum percentage of chromium in the alloy is increased from 15% to 30% proportionate to the increase in the chloride concentration of the solution. With respect to the nickel in the alloy, it contains a maximum percentage of nickel which, as pointed out above, is always less than the percentage of chromium present, and is likewise correlated with the concentration of chloride in the solution wetting the metal so that the maximum percentage of nickel is decreased from below 30% to below 2% proportionate to an increase in the chloride concentration of the solution from 0.2-normal to 2-normal.

It will thus be seen that when the solution containing nitric and hydrochloric acids which wets the metal contains a chloride concentration of 0.2-normal or less any chrome-iron alloy containing 15% to 30% chromium, 0% to below 30% nickel, but with the nickel content less than the chromium content, and the remainder principally iron, will be suitably resistant to corrosion. However, with increasing concentrations of chloride in the solution wetting the alloy, there is a progressive increase in the minimum chromium content up to 30% and a progressive decrease in the maximum nickel content downwardly to below 2% as the chloride concentration of the solution increases up to 2-normal.

In the accompanying drawing there is plotted data showing the relationship between the composition of the chrome-iron alloy and the chloride content of the solution of nitric acid and hydrochloric acid with which the alloy is wetted in operating in accordance with this invention. Concentrations of chloride in the solution wetting the alloys are plotted along line A—B and the percentages of chromium and nickel in the alloys are plotted along line A—C. The line D—E—C shows the maximum percentages of nickel and the line F—G—H the minimum percentages of chromium in the chrome-iron alloys used in carrying out this invention for varying concentrations of chloride in the solution wetting the alloys which are never above 2-normal. When the solution wetting the metal alloy contains a given maximum chloride concentration (not exceeding 2-normal) or less, any chrome-iron alloy containing a percentage of chromium and nickel represented by points on a line parallel to line A—C intersecting the point on line A—B representing the given maximum chloride concentration of the solution, in which the percentage of nickel is less than that of the chromium and is within the area bounded by lines A—B—D—E—C and in which the percentage of chromium is within the area bounded by the lines F—G—H—I, and the remainder of the alloy is principally iron, may be employed for carrying out my invention. For example, with the chloride in the solution no greater than 0.2-normal, alloys containing 30% chromium, 29% or 0% nickel and the remainder principally iron are suitable, as are also alloys containing 15% chromium, 14% or 0% nickel and the remainder principally iron. When the chloride concentration of the solution is 1-normal, alloys containing 22% to 30% chromium, 16% to 0% nickel and the remainder principally iron are suitable. For a solution the chloride concentration of which is 2-normal, an alloy containing 30% chromium, less than 2% nickel and the remainder principally iron may be used.

It is preferred, whenever possible, to maintain the chloride content of the solutions in contact with the chrome-iron alloys at not above 0.25-normal and to employ for the surfaces in contact with such solutions, as well as for solutions containing higher concentrations of chloride, an alloy containing about 28% chromium, less than 2% nickel and the remainder principally iron.

The following examples illustrate preferred embodiments of this invention but the invention is not limited thereto:

*Example I.*—In my copending application Serial No. 684,829, filed August 12, 1933, now United States Patent No. 2,148,429 of February 28, 1939, I have described and claimed a process for the production of a metal nitrate solution by reaction of nitric acid and a metal chloride, for example, a solution of sodium nitrate by reacting nitric acid and sodium chloride. In carrying out that process, a reaction mixture is prepared by mixing nitric acid of a concentration above about 40% $HNO_3$ with solid, substantially dry sodium chloride. The amount of acid is in excess of that required for reaction with the chloride to form sodium nitrate and a gas mixture of nitrosyl chloride and chlorine in accordance with the following equation:

$$4HNO_3 + 3NaCl = 3NaNO_3 + NOCl + Cl_2 + 2H_2O$$

For other metal chlorides than sodium chloride, the proportion by weight of acid to chloride may be varied but in every case more than 4 gram mols of $HNO_3$ will be used for every 3 gram atoms of chlorine in the metal chloride.

The reaction mixture thus prepared is heated in a plurality of reaction stages at increasing temperatures up to the boiling point of the reaction mixture and this heating is continued until the chloride is substantially completely decomposed. The resulting solution contains but a small amount of residual undecomposed chloride but is strongly acid with nitric acid due to the excess acid used in making up the reaction mixture. This solution is then boiled by indirect heat transfer to provide steam which is passed in direct contact with the reaction mixture to heat it in the manner described. The solution in the boiler may have, for example, the following approximate composition:

| | Parts |
|---|---|
| $NaNO_3$ | 124½ |
| $HNO_3$ | 25 |
| NaCl | 4 |
| $H_2O$ | 161½ |

The composition of the solution as given above states the chloride content of the solution in terms of sodium chloride. It will be understood, however, that because of the solution being acidic the chloride will in fact be in the solution both as sodium chloride and as hydrochloric acid. The specific gravity of a solution having the above composition is 1.36 at 60° C. Accordingly, in terms of normality the nitrate content of this solution is 8-normal and the chloride content is 0.3-normal.

In constructing an apparatus for carrying out this process for reacting nitric acid and sodium chloride the heat transfer surfaces in the boiler are preferably composed of a chrome-iron alloy containing about 28% chromium, less than 2% nickel and the remainder principally iron. The heater is constructed so as to maintain the heat transfer surfaces composed of this alloy completely submerged in the solution. If desired, other portions of the heater may likewise be constructed of the same alloy as is used for the heat transfer surfaces so long as these portions of the heater are maintained completely wetted with solution in which the concentration of chloride does not exceed 1.7-normal.

*Example II.*—The nitrosyl chloride and chlorine gas mixture accompanied by vapors of nitric acid and water as it leaves contact with the reaction mixture in carrying out the process described in above Example I may be cooled and dried by being passed through a tower in which it is directly contacted with cool nitric acid. For example, the gas leaving the reaction mixture at a temperature of about 60° C. may be passed through a tower in contact with a descending flow of nitric acid introduced into contact with the gas at a temperature of 30° C. or lower. The nitric acid used for cooling the gas contains sufficient $HNO_3$ and is contacted with the gas in amounts such that the acid drawn from the bottom of the tower after contact with the nitrosyl chloride-chlorine gas, which has become diluted with the water condensed and absorbed from the gases, contains at least 30% $HNO_3$.

In thus cooling the nitrosyl chloride-chlorine gas mixture, there will be some reaction of nitrosyl chloride with the water condensed from the gas or in the nitric acid introduced into contact with the gas. The acid solution will, therefore, contain both nitric and hydrochloric acids and be highly corrosive towards most metals. In accordance with this invention, the tower used for contacting the nitric acid and gas is constructed of a chrome-iron alloy containing 15% to 30% chromium, 0% to below 30% nickel, with the nickel content less than the chromium content, and the remainder principally iron and corrosion of the tower prevented by washing the interior surfaces exposed to contact with the nitrosyl chloride-chlorine gas mixture with the nitric acid solution passed through the tower. The concentration of chloride in the solution wetting the chrome-iron surfaces of the tower will depend upon the conditions of operation such as proportion of nitric acid to nitrosyl chloride-chlorine gas, concentration of nitric acid used and temperature of the liquid in the tower. Accordingly, the procedure is so operated as to maintain the chloride concentration of the liquid wetting the chrome-iron alloy below 2-normal. Furthermore, in determining the composition of a chrome-iron alloy suitable for use as a material of construction for this tower, the proportions of chromium and nickel will be correlated to the chloride concentration of the solution which is to wet the metal surfaces of the tower. If the metal is to be wetted with a solution containing more than 0.2-normal chloride the minimum percentage of chromium in the alloy used will be increased from 15% to 30% proportionate to an increase in the chloride concentration from 0.2-normal to 2-normal and the maximum percentage of nickel will be decreased from below 30% to below 2% proportionate to an increase in the chloride concentration from 0.2-normal to 2-normal.

*Example III.*—In my copending application Serial No. 684,830, filed August 12, 1933, now United States Patent No. 2,124,536 of July 26, 1938, I have described a process wherein a reaction mixture of nitric acid and sodium chloride is processed as described in Example I above to form a sodium nitrate solution of the composition given in that example. This solution is then evaporated under a vacuum of about $\frac{1}{10}$ of an atmosphere to concentrate it while retaining in the solution the nitric acid and hydrochloric acid. The solution is continuously introduced into concentrated solution in the evaporator and the rate of evaporation is controlled so that the evaporating solution contains about 25% to 50% nitric acid. Since the solution introduced into the evaporator contains 7.9% $HNO_3$ and 1.27% sodium chloride, when it has been concentrated to contain 30% nitric acid it will contain 4.8% sodium chloride. The specific gravity of such a solution is 1.36 and the solution is saturated at a temperature of about 60° C. with sodium nitrate. It will, therefore, be about 9.5-normal with nitrate and 1.1-normal with chloride.

The vacuum evaporator used for carrying out this process is constructed of a chrome-iron alloy containing 28% chromium, less than 2% nickel and the remainder principally iron. The composition of this alloy is within the limits of less than 16% nickel and more than 22.5% chromium suitable for use in contact with solutions 1.1-normal with chloride in accordance with this invention. The interior surfaces of this evaporator are maintained completely wetted with the incoming acidic nitrate solution or with the solution undergoing evaporation in the vessel. Other chrome-iron alloys than that specified may be employed for the construction of this vessel when the solutions in the vessel are evaporated to some other nitric acid concentration between 25% and 50% with a corresponding change in the chloride concentration so long as the alloy composition is correlated with the chloride content of the solution contacted with the alloy in the manner hereinabove described.

The process of this example may advantageously be modified to produce by reaction of the nitric acid and sodium chloride a solution of sodium nitrate containing a lower concentration of chloride than that given above, followed by evaporation of the solution in chrome-iron apparatus. For example, the nitric acid and sodium chloride may be reacted under conditions forming a solution having the following composition:

|  | Per cent |
|---|---|
| $NaNO_3$ | 35.6 |
| $H_2O$ | 44.0 |
| $HNO_3$ | 20.0 |
| $NaCl$ | 0.4 |

The chloride content of such a solution is 0.07-normal. This solution may be evaporated to recover sodium nitrate by concentrating it in a vacuum evaporator until it has the following composition:

|  | Per cent |
|---|---|
| $NaNO_3$ | 19.3 |
| $H_2O$ | 43.6 |
| $HNO_3$ | 36.4 |
| $NaCl$ | 0.7 |

The chloride content of this solution is 0.17-normal. The metal surfaces exposed to contact with these solutions, both before, during and after the evaporation to recover sodium nitrate, are preferably constructed of a chrome-iron alloy containing 28% chromium, less than 2% nickel and the remainder principally iron.

*Example IV.*—In my copending application Serial No. 126,621, filed February 19, 1937, now United States Patent No. 2,138,017 of November 29, 1938, I have described a process for the oxidation of nitrosyl chloride by means of concentrated nitric acid. In this process nitrosyl chloride gas is introduced into the bottom of a tower to the mid-portion of which concentrated nitric acid containing, for example, about 80% $HNO_3$ is introduced. The acid flows downwardly through the tower in contact with the descending nitrosyl chloride gas. Hot nitric acid vapors are also introduced into the bottom of the tower to heat the nitric acid in the lower portion of the tower to a temperature of about 100° C. or higher. Vapors of nitric acid and water and the oxidation products of the nitrosyl chloride (chlorine and nitrogen tetroxide), together with any unoxidized nitrosyl chloride, pass upwardly through the upper portion of the tower. A cooler at the top of the tower serves to cool the gases and vapors and to condense the nitric acid, which is refluxed in contact with the ascending gases and vapors in the upper portion of the tower. The rate of supply of 80% nitric acid to the mid-portion of the tower and of nitrosyl chloride gas to the bottom of the tower and the rate of heating the materials in the tower and of cooling the vapors and gases at the top of the tower are so correlated as to maintain the acid in the mid-portion of the tower at a concentration of 75% to 85% $HNO_3$. The strongly acid solution flowing from the bottom of the tower has a temperature of about 90° C. and contains, for example, about 50% $HNO_3$.

In carrying out this process the acid solution in the tower will contain some hydrochloric acid, nitrosyl chloride and chlorine in addition to the nitric acid. A chrome-iron alloy containing 28% chromium, less than 2% nickel and the remainder principally iron is suitable as a material of construction for the tower used in carrying out the process as described, since under the stated conditions of operation the solutions with which the interior surfaces of the tower are wetted will be not above 1.7-normal with chloride and will contain a concentration of nitrate substantially greater than the chloride concentration. Since the conditions under which the process is operated will determine the chloride content of the solution in the tower, under some conditions of operation the chloride in the solution in the bottom portion of the tower may be above 2-normal. Under such conditions the upper portion of the tower, where the chloride content of the solution is below 2-normal, may be constructed of the above chrome-iron alloy while the lower portion of the tower may be constructed of another material, such as ceramic ware, which is suitably resistant to the solutions containing a high chloride content present in this portion of the tower.

While the above examples illustrate several specific applications of the present invention to carrying out processes for reacting mixtures of nitric acid and metal chloride to form the corresponding metal nitrate, the evaporation of solutions containing nitric acid and chloride, and for the treatment with nitric acid of a gas containing nitrosyl chloride with or without chlorine, the invention has numerous other applications where solutions containing both nitric and hydrochloric acids are to be treated or stored in vessels or be transferred through pipes from one point to another.

Example II describes the application of this invention to a procedure for the treatment of a gas mixture containing nitrosyl chloride, chlorine and water vapor. The invention is equally applicable to the treatment of a gas containing nitric and hydrochloric acid vapors, a gas containing nitrosyl chloride and water vapor, without chlorine present, or a gas containing nitrogen oxides in a state of oxidation corresponding to $N_2O_3$ or higher and water vapor and in addition chlorine, nitrosyl chloride or hydrogen chloride. In the case of each of the gases enumerated any aqueous condensate forming from these gases will contain both nitric and hydrochloric acids and will be highly corrosive to most metals. Even though the amount of condensate on metal surfaces in contact with such gases be small so that it forms but a film on the metal, the metal is subject to attack by the acidic film. This invention is applicable to the storage, treatment or transfer through pipes of such gases at or below their dew points. In utilizing the invention to employ chrome-iron alloys in apparatus where the alloy is exposed to contact with condensate from such gases, the composition of the aqueous solution of nitric acid and hydrochloric acid wetting the alloy may be controlled by regulating the amounts of water vapor and nitric acid vapor or nitrogen oxides in the gases.

In maintaining the chrome-iron surfaces completely wetted with a solution of nitric and hydrochloric acids in practicing this invention, it is not necessary, as indicated above, that the surface be completely submerged in a body of solution. It is sufficient if the metal surface be covered with a film of the solution such as may be formed by cooling to or below its dew point a moist gas from which a condensate containing both nitric and hydrochloric acids is formed.

This application is a continuation-in-part of my copending applications Serial Nos. 684,829 and 684,830, filed August 12, 1933, now United States Patents Nos. 2,148,429 of February 28, 1939 and 2,124,536 of July 26, 1938, respectively.

I claim:

1. In treating a liquid containing nitric acid, hydrochloric acid and water in an apparatus wherein surfaces thereof are exposed to contact with said liquid, the improvement which comprises constructing said surfaces of a chrome-iron alloy containing 15% to 30% chromium, 0% to below 30% nickel, with the nickel content less than the chromium content, and the remainder principally iron, maintaining said surfaces completely wetted with an aqueous solution containing nitric acid and hydrochloric acid in which the concentration of nitrate is at least equal to the concentration of chloride and the chloride concentration is below 2-normal and so correlating the composition of said alloy with the composition of the solution with which it is wetted that an alloy wetted with solution containing a chloride concentration above 0.2-normal contains at least a minimum percentage of chromium which is increased from 15% to 30% proportionate to an increase in said chloride concentration from 0.2-normal to 2-normal and contains no more than a maximum percentage of nickel which is decreased from below 30% to below 2% proportionate to an increase in said chloride concentration from 0.2-normal to 2-normal.

2. In heating an aqueous solution containing nitric acid and hydrochloric acid in which the concentration of nitrate is at least equal to the concentration of chloride and the chloride concentration is below 2-normal, the improvement which comprises heating said solution in contact with surfaces of a chrome-iron alloy containing 15% to 30% chromium, 0% to below 30% nickel, with the nickel content less than the chromium content, and the remainder principally iron, maintaining said surfaces completely wetted with said aqueous solution, and so correlating the composition of said alloy with the composition of the solution with which it is wetted that an alloy wetted with solution containing a chloride concentration above 0.2-normal contains at least a minimum percentage of chromium which is increased from 15% to 30% proportionate to an increase in said chloride concentration from 0.2-normal to 2-normal and contains no more than a maximum percentage of nickel which is decreased from below 30% to below 2% proportionate to an increase in said chloride concentration from 0.2-normal to 2-normal.

3. In a process wherein a chloride and nitric acid are reacted to form a nitrate, chlorine and nitrosyl chloride, that improvement which comprises preparing a reaction mixture of aqueous nitric acid and a chloride of a metal from the group consisting of the alkali and alkaline earth metals in the proportions of more than 4 mols of $HNO_3$ for every 3 atoms of chloride in the metal chloride, heating the reaction mixture thus prepared at increasing temperatures up to a temperature at which said mixture boils, and the resulting solution contains but a small amount of residual undecomposed chloride, then boiling said solution by heat exchange with metal surfaces consisting of a chrome-iron alloy having chromium and nickel contents in the ranges of 15% to 30% chromium, 0% to below 30% nickel and the remainder principally iron, with the nickel content less than the chromium content and the composition of the alloy so correlated with the composition of said solution that when the solution contains a concentration of chloride above 0.2-normal the minimum percentage of chromium in the alloy increases from 15% to 30% proportionate to the increase in said chloride concentration from 0.2-normal to 2-normal and the maximum percentage of nickel decreases from below 30% to below 2% proportionate to an increase in said chloride concentration from 0.2-normal to 2-normal, passing the steam evolved by boiling said solution in direct contact with said reaction mixture, the steam being passed in contact with the reaction mixture while it is being heated up to its boiling point, continuing the boiling of said solution and passage of the steam thus obtained in direct contact with the reaction mixture sufficiently long to promote a substantially complete decomposition of the chloride in the reaction mixture and to maintain in the solution in contact with said metal surfaces a concentration of chloride below 2-normal to prevent rapid corrosion of said surfaces, and maintaining said metal surfaces completely wetted with said solution.

4. In a process wherein a chloride and nitric acid are reacted to form a nitrate, chlorine and nitrosyl chloride, that improvement which comprises preparing a reaction mixture of aqueous nitric acid and a chloride of a metal from the group consisting of the alkali and alkaline earth metals in the proportions of more than 4 mols of HNO₃ for every 3 atoms of chloride in the metal chloride, heating the reaction mixture thus prepared at increasing temperatures up to a temperature at which said mixture boils, and the resulting solution contains but a small amount of residual undecomposed chloride, then boiling said solution by heat exchange with metal surfaces consisting of a chrome-iron alloy containing about 28% chromium, less than 2% nickel, and the remainder principally iron, passing the steam thus evolved in direct contact with said reaction mixture, the steam being passed in contact with the reaction mixture while it is being heated up to its boiling point, and continuing the boiling of said solution and passage of the steam thus obtained in direct contact with the reaction mixture sufficiently long to promote a substantially complete decomposition of the chloride in the reaction mixture and to maintain in the solution in contact with said metal surfaces a concentration of chloride below 2-normal to prevent rapid corrosion of said surfaces and maintaining said metal surfaces completely wetted with said solution.

5. In a process for the recovery of an alkali metal nitrate by evaporation of an aqueous solution of the same containing nitric acid and a substantial concentration of hydrochloric acid, that improvement which comprises heating the solution to evaporate it in contact with surfaces composed of a chrome-iron alloy containing about 28% chromium, less than 2% nickel and the remainder principally iron, maintaining said surfaces completely wetted with said solution, maintaining the chloride concentration in the solution not above 1.7-normal, maintaining a concentration of the nitric acid in said solution substantially greater than the concentration of said chloride and upward to 50% HNO₃, and heating said solution under a pressure below atmospheric at which water vapor is evolved from the solution.

6. In a process wherein a gas containing nitrosyl chloride is treated by direct contact with aqueous nitric acid solution in a vessel and the nitric acid solution in the vessel contains hydrochloric acid, the improvement which comprises constructing surfaces of said vessel which are exposed to contact with said nitric acid containing hydrochloric acid of a chrome-iron alloy containing 15% to 30% chromium, 0% to below 30% nickel, with the nickel content less than the chromium content, and the remainder principally iron, maintaining said surfaces completely wetted with an aqueous solution of nitric acid and hydrochloric acid in which the concentration of nitrate is at least equal to the concentration of chloride and the chloride concentration is below 2-normal and so correlating the composition of said alloy with the composition of the solution with which it is wetted that an alloy wetted with solution containing a chloride concentration above 0.2-normal contains at least a minimum percentage of chromium which is increased from 15% to 30% proportionate to an increase in said chloride concentration from 0.2-normal to 2-normal and contains no more than a maximum percentage of nickel which is decreased from below 30% to below 2% proportionate to an increase in said chloride concentration from 0.2-normal to 2-normal.

7. In a process wherein nitrosyl chloride gas is passed in a vessel in direct contact with hot concentrated nitric acid solution to oxidize the nitrosyl chloride and the nitric acid solution in said vessel contains hydrochloric acid, that improvement which comprises constructing surfaces of said vessel which are contacted with nitric acid solution containing hydrochloric acid in which the chloride concentration is below 2-normal of a chrome-iron alloy containing 15% to 30% chromium, 0% to below 30% nickel, with the nickel content less than the chromium content, and the remainder principally iron, maintaining said surfaces completely wetted with an aqueous solution of nitric acid and hydrochloric acid in which the concentration of nitrate is at least equal to the concentration of chloride and so correlating the composition of said alloy with the composition of the solution with which it is wetted that an alloy wetted with solution containing a chloride concentration above 0.2-normal contains at least a minimum percentage of chromium which is increased from 15% to 30% proportionate to an increase in said chloride concentration from 0.2-normal to 2-normal and contains no more than a maximum percentage of nickel which is decreased from below 30% to below 2% proportionate to an increase in said chloride concentration from 0.2-normal to 2-normal.

8. In a process wherein nitrosyl chloride gas is passed in a vessel in direct contact with hot concentrated (about 50% and stronger) nitric acid solution to oxidize the nitrosyl chloride and the nitric acid solution in said vessel contains a substantial concentration of hydrochloric acid, that improvement which comprises constructing surfaces of said vessel which are contacted with nitric acid solution containing hydrochloric acid in which the chloride concentration is not above 1.7-normal of a chrome-iron alloy containing about 28% chromium, less than 2% nickel and the remainder principally iron, and maintaining said surfaces completely wetted with said last mentioned solution.

9. In treating an aqueous liquid containing nitric acid and a substantial concentration of hydrochloric acid in an apparatus wherein surfaces thereof are exposed to contact with said liquid, the improvement which comprises constructing said surfaces of a chrome-iron alloy containing about 28% chromium, less than 2% nickel and the remainder principally iron, and maintaining said surfaces completely wetted with an aqueous solution containing nitric acid and hydrochloric acid in which the concentration of nitrate is at least equal to the concentration of chloride and the chloride concentration is not above 0.25-normal.

10. In heating an aqueous solution containing nitric acid and a substantial concentration of hydrochloric acid in which solution the concentration of nitrate is at least equal to the concentration of chloride and the chloride concentration is not above 0.25-normal, the improvement which comprises heating said solution in contact with surfaces of a chrome-iron alloy containing about 28% chromium, less than 2% nickel, and the remainder principally iron, and maintaining said surfaces completely wetted with said aqueous solution.

HERMAN A. BEEKHUIS, Jr.